April 7, 1970     R. T. TOWNSEND     3,504,721
SKINNING APPARATUS WITH AUTOMATIC BLADE CONTROL
Filed Feb. 20, 1968     5 Sheets-Sheet 1
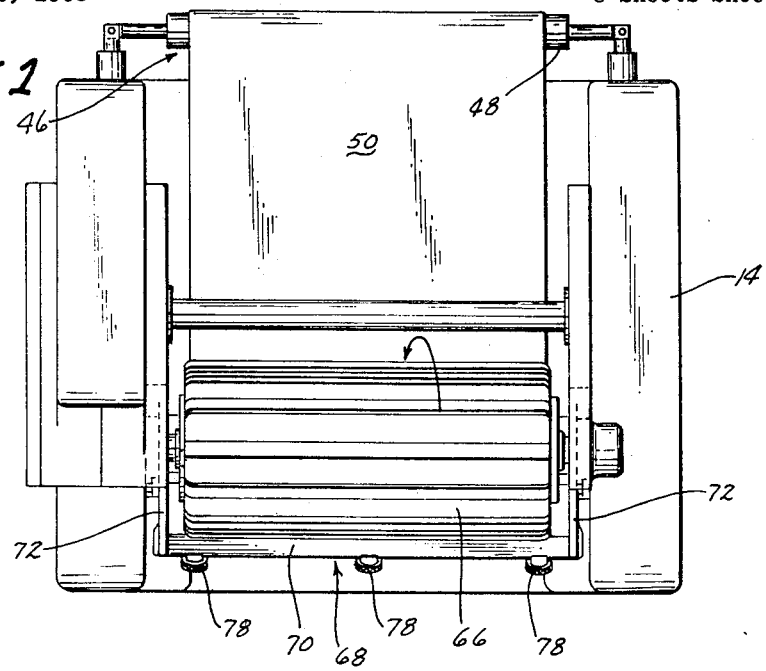
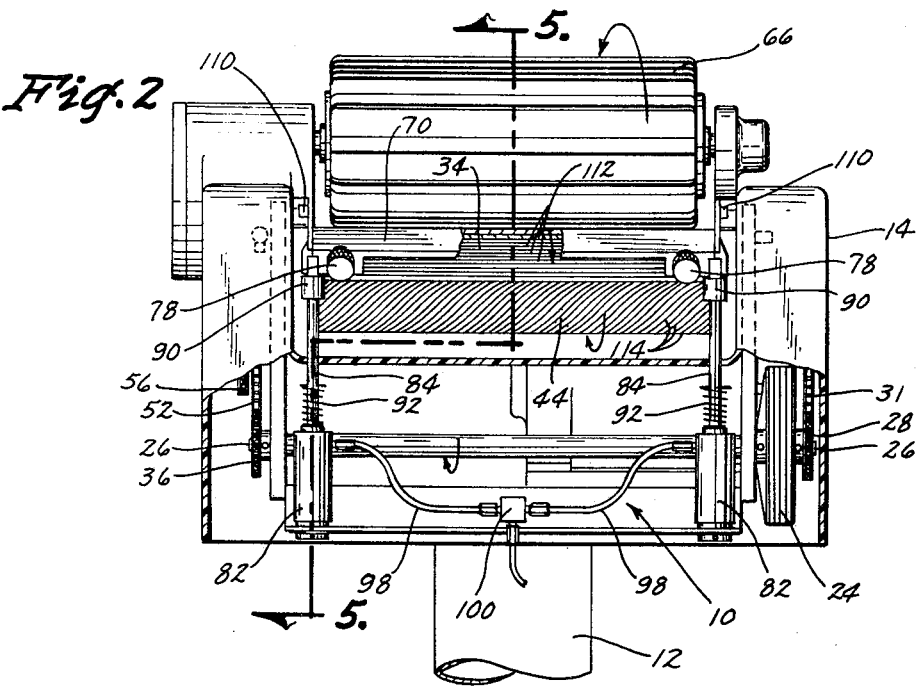
INVENTOR
RAY T. TOWNSEND
BY Zarley, McKee & Thomte
ATTORNEYS April 7, 1970    R. T. TOWNSEND    3,504,721
SKINNING APPARATUS WITH AUTOMATIC BLADE CONTROL
Filed Feb. 20, 1968    5 Sheets-Sheet 2

INVENTOR
RAY T. TOWNSEND
BY
Zarley, McKee & Thomte
ATTORNEYS

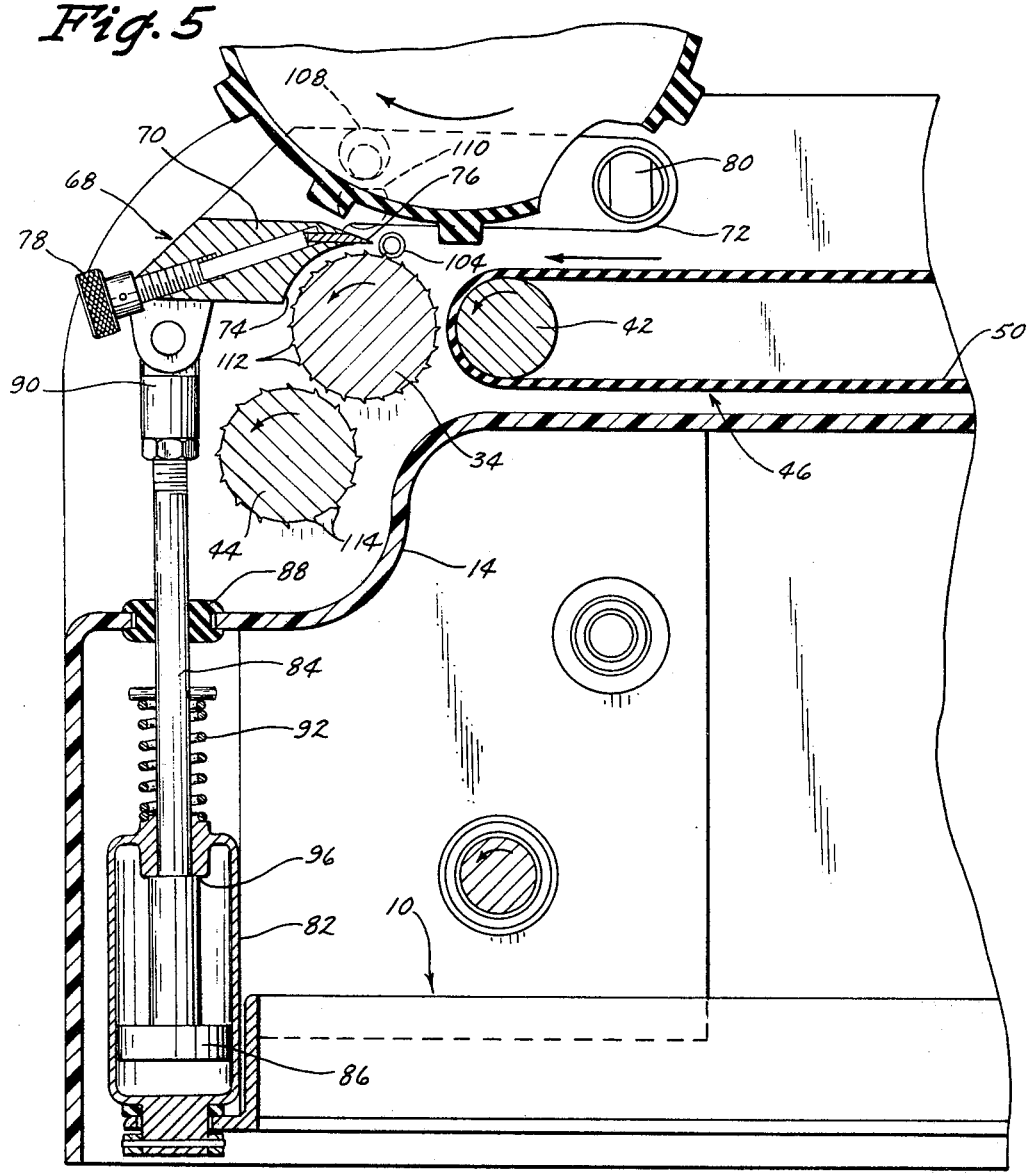

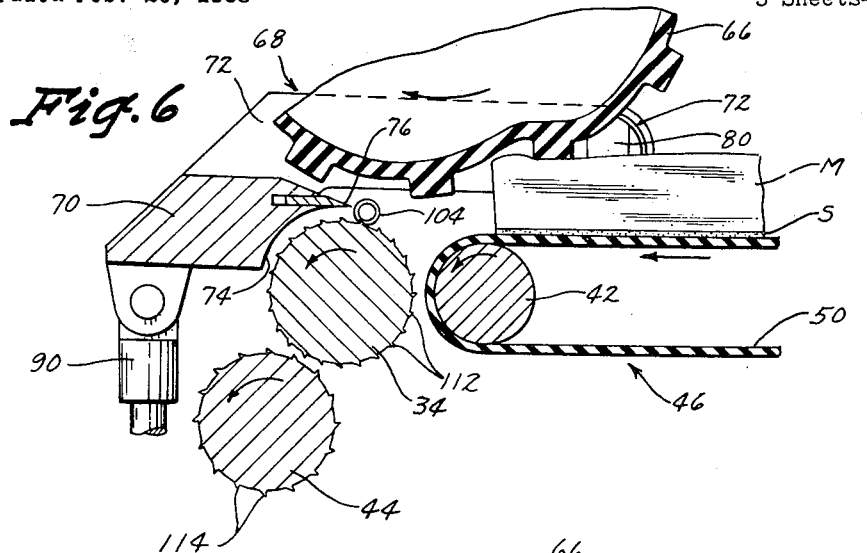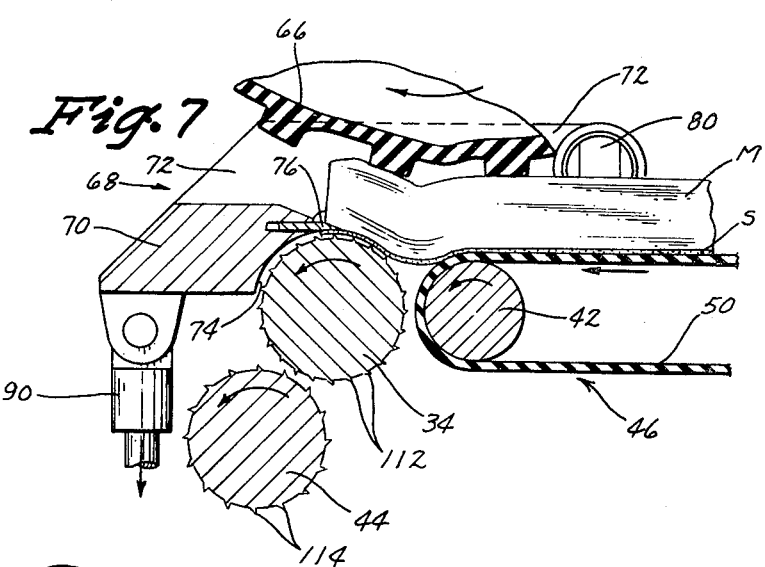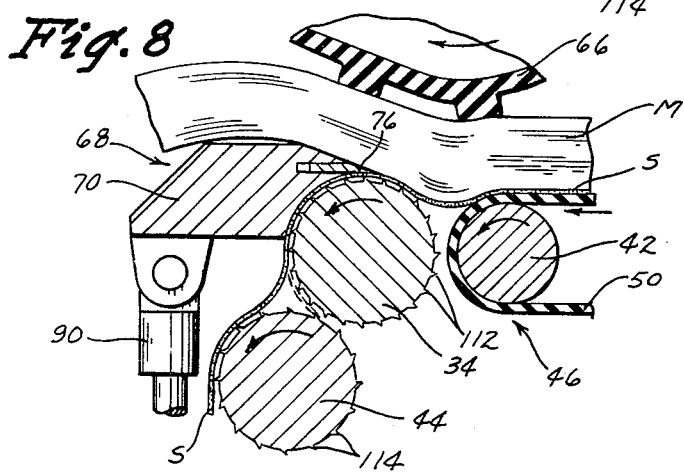

April 7, 1970      R. T. TOWNSEND      3,504,721
SKINNING APPARATUS WITH AUTOMATIC BLADE CONTROL
Filed Feb. 20, 1968      5 Sheets-Sheet 5
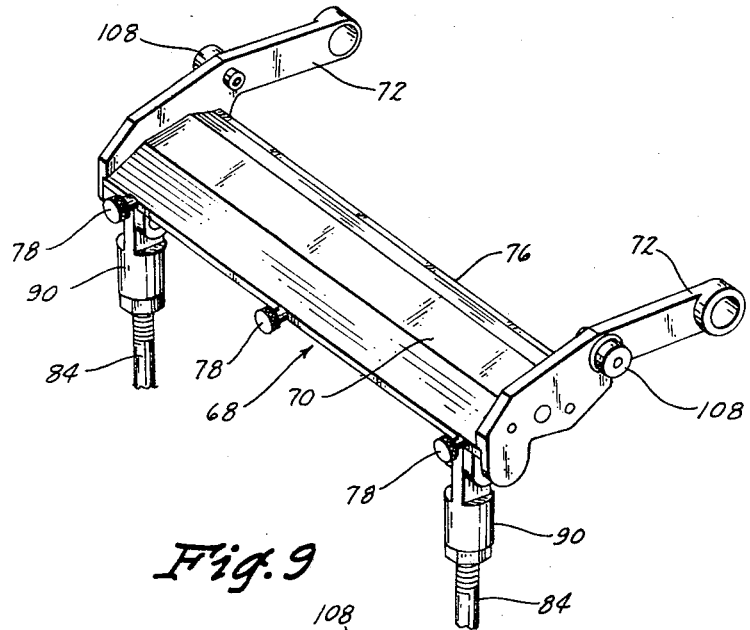
Fig. 9
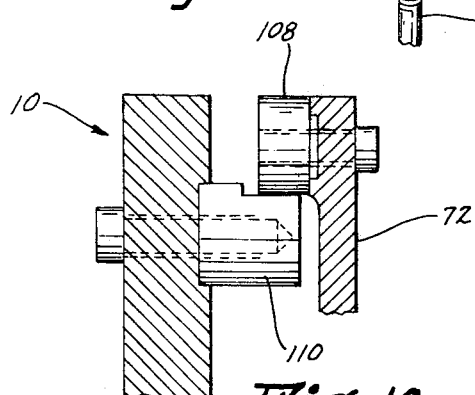
Fig. 10
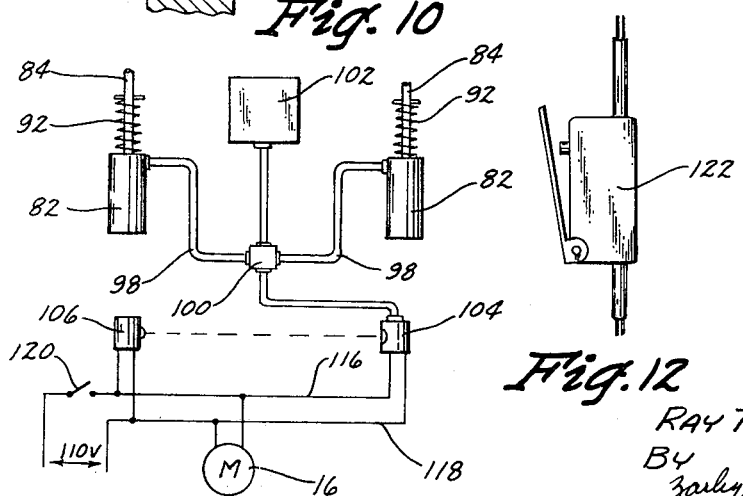
Fig. 11
Fig. 12
INVENTOR
RAY T. TOWNSEND
BY
Zarley, McKee & Thomte
ATTORNEYS United States Patent Office 3,504,721
Patented Apr. 7, 1970

3,504,721
SKINNING APPARATUS WITH AUTOMATIC
BLADE CONTROL
Ray T. Townsend, Des Moines, Iowa, assignor to Townsend Engineering Company, Des Moines, Iowa, a corporation of Iowa
Continuation-in-part of application Ser. No. 616,692, Feb. 16, 1967. This application Feb. 20, 1968, Ser. No. 706,940
Int. Cl. A22c 17/12
U.S. Cl. 146—130                                7 Claims

ABSTRACT OF THE DISCLOSURE

A meat skinning machine of the type having a skin gripping roll and a concave shoe cooperating with a skinning blade and the gripping roll to pull the skin through the machine and part the skin from a piece of meat. A stripper roll is mounted adjacent the gripper roll to strip the skin from the gripper roll after the skin has been removed from the meat. The shoe and skinning blade are held concentrically with the gripping roll by air piston means. The air piston means are controlled by a photoelectric cell means which functions to instantaneously move the shoe and blade to the skinning position as soon as the meat approaches the close proximity of the blade. The instantaneous initial bite of the blade into the meat is enhanced and accelerated by pivoting the shoe above and forwardly of the point of engagement of the blade with the oncoming meat to be skinned. The method involves the holding of the shoe adjacent the gripping roll concentrically with sufficient force to grip the removed skin but with insufficient force to prevent puncture of the skin by the gripping roll. The method further holds the skin uniformly against the gripper roll, and then strips the skin from the gripper roll by a remotely located stripper roll to insure that a uniform thickness of skin is removed.

This application is a continuation-in-part of copending application Ser. No. 616,692 filed Feb. 16, 1967, now abandoned.

The principal object of this invention is to increase the yield resulting from a skinned piece of meat, and this result is achieved by minimizing or eliminating the fat from the skin that is removed from the meat. Skinning machines of the character shown in Patents Nos. 2,522,728 and Re. 23,222 have the disadvantage of leaving a small ribbon of fat on the skin removed from the meat in the area of the stripping elements on the gripping rollers, and this is occasioned by the meat and attached skin "slumping" into the grooves of the stripping roller in which the stripping elements are mounted. It is therefore an object of this invention to provide a method and means of skinning meat which will remove skin from meat in substantially uniform layers and which will eliminate the above described ribbons of fat which are sometimes left on skins removed by prior art devices. More specifically, it is an object of this invention to provide a method and means for skinning meat wherein the skin is uniformly supported on the gripping roll, and is removed therefrom by a stripper roll remotely positioned with respect to the gripper roll.

Prior skinning devices of the type mentioned heretofore have not precisely controlled throughout the skinning operation the relative concentric positions of the gripping roll and the concave pressure shoe on which the blade is mounted, nor has the pressure between these components been carefully controlled. The results of these problems in the prior art are that some defective skinning results, and the separated skin is often mutilated or otherwise damaged by the gripper roll. Therefore, it is an object of this invention to provide a method and means for skinning meat whereby the juxtaposition and pressure between the concave shoe and the gripping roll are carefully maintained in a predetermined condition throughout the skinning operation to separate a uniform layer of skin and to avoid damage to the skin as it is removed.

A further problem of prior art skinning devices is the limited number of pieces of meat that can be skinned in a given period of time. In some machines, the skinning cycle is manually controlled, and in others the skinning machine is set to cycle only a given number of times during a fixed period of time. It is therefore a further object of this invention to provide a method and means for skinning meat that can greatly accelerate the number of pieces of meat that can be skinned in a given period. In this same connection, it is a still further object of this invention to provide a method and means for skinning meat that will permit the skinning blade to quickly be moved to a cutting position so that an excess of fat will not be left on the edge of the skin initially cut from the meat. More specifically, the forward pivotal position of the arm-supported pressure shoe upon which the skinning blade is mounted permits the blade to more quickly and more effectively make its initial bite into the meat. A photoelectric cell or switch, which are actuated by the meat as it moves into the cutting zone, instantaneously bring the pressure shoe and the skinning blade into the skinning position.

A still further object of this invention is to provide serrations on the stripper roll in the form of teeth which slant forwardly with respect to the direction of rotation of the stripper roll in order to move effectively, disengage the skin from the skin gripping roll, and also to carry it away from the skin gripping roll without clogging the skin gripping surface thereof.

An additional object of this invention is to provide a stripper mechanism for a skinning machine which is easy to clean and keep in a sanitary condition as required for machines of the general character herein disclosed.

A still further object of this invention is to provide a skinning machine which is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a plan view of the skinning machine of this invention;

FIGURE 2 is a rear elevation there of the discharge side of the machine with certain parts being broken away to more fully illustrate its construction;

FIGURE 5 is an enlarged scale sectional view taken on line 5—5 of FIGURE 2;

FIGURE 6 is a partial sectional view similar to that of FIGURE 5 but shows the components as a piece of meat is approaching the cutting zone;

FIGURE 7 is a partial sectional view similar to that of FIGURE 6 but shows the blade making its initial cut into the meat;

FIGURE 8 is a partial sectional view similar to that of FIGURE 6 but shows the operating position of the components during the skinning operation;

FIGURE 9 is a partial perspective view of the shoe assembly;

FIGURE 10 is a sectional view of the stop for the shoe assembly taken on line 10—10 of FIGURE 9;

FIGURE 11 is a schematic view of the power control system for the shoe assembly; and FIGURE 12 is a plan view of an electrical pressure responsive switch which can be used in lieu of the photoelectric cell for purposes of controlling the action of the shoe assembly.

Figure 3:
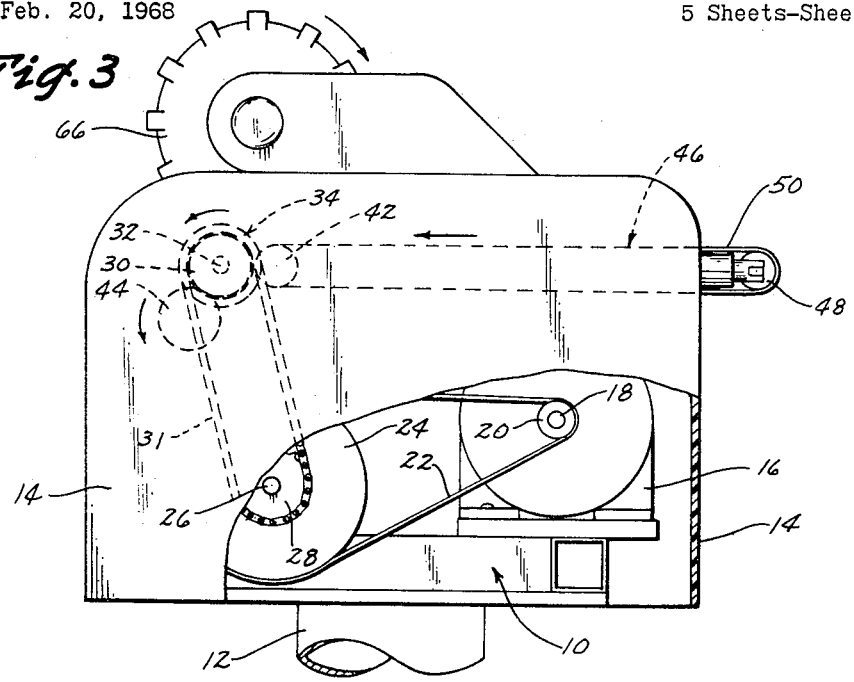
FIGURE 3 is a side elevation thereof with a portion of the housing being broken away to more fully show its construction.

Frame 10 (FIGURE 3) is supported on pedestal 12, and housing 14 of fiberglass or the like is secured to frame 14 in any convenient manner. Electric motor 16 is secured to frame 10 and has power output shaft 18 with pulley 20 rigidly secured thereto. Belt 22 connects pulley 20 to drive pulley 24 which is mounted on shaft 26. Shaft 26 is journaled by conventional bearings (not shown) on frame 10. Drive gear 28 is rigid with shaft 26 and is operatively connected by chain 31 to a like gear 30 on the end of shaft 32. Shaft 32 is journaled by any conventional bearing means on frame 10. Gear 30 is rigidly secured to the end of gripper roll 34.

Figure 4:
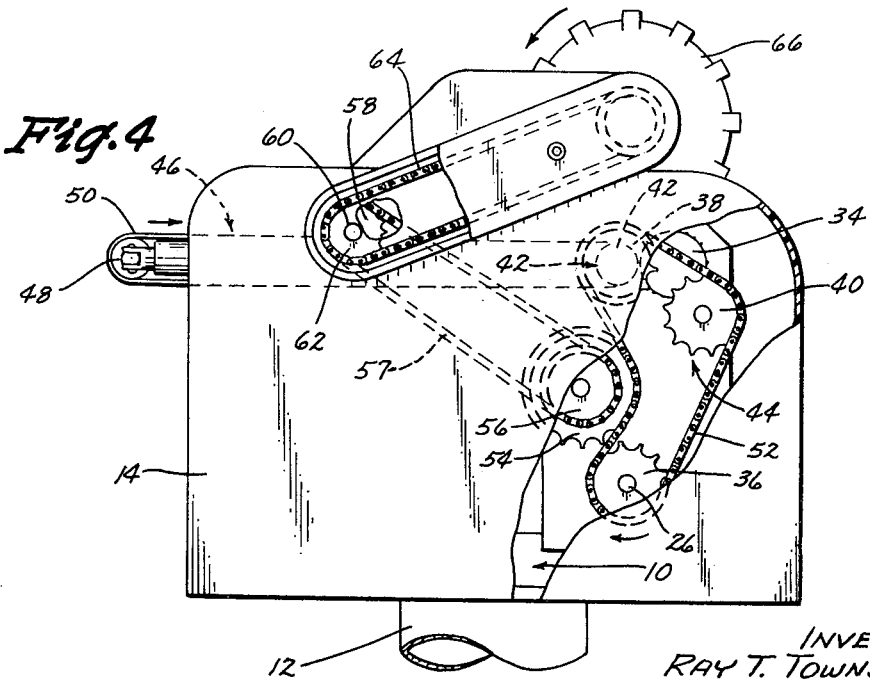
FIGURE 4 is a side elevation view similar to that of FIGURE 3 but viewed from the opposite side of the machine.

With reference to FIGURE 4, gear 36 is also fixed to shaft 26 and is in operative engagement with like gears 38 and 40 on the ends of drive roll 42 and skin stripping roll 44, respectively. Each of the rolls 42 and 44 is rotatably journaled in suitable bearings within housing 14. Drive roll 42 is a part of conveyor 46 which includes idler roll 48 and belt 50. Chain 52 effects the operative connection between gears 36, 38 and 40.

Gear 54 is rotatably mounted within housing 14 and is in mesh with chain 52 (FIGURE 4). A drive gear 56 is rigidly secured thereto and is operatively connected by chain 57 to gear 58 on shaft 60, which in turn is rotatably mounted on frame 10 by any convenient means. Gear 62 is rigid with gear 58 and is operatively connected by chain 64 to a gear on the shaft of pneumatic hold-down roller 66. The hold-down roller 66 is made and functions in accordance with Patent No. 2,722,255, issued Nov. 1, 1955.

Shoe assembly 68 (FIGURE 9) includes a pressure shoe 70 mounted on forwardly and upwardly extending arms 72. As shown in FIGURES 5–8, shoe 70 has a concave circular surface 74 below and rearwardly of skinning blade 76. Adjusting screws 78 (FIGURE 5) are provided in shoe 70 for adjusting the position of skinning blade 76. Shoe assembly 68 is rotatably secured to frame 10 forwardly and above the cutting edge of blade 76 by pins 80 which are secured to forward ends of arms 72. As will be discussed hereafter, the pivotal location of arms 72 greatly enhances the initial bite of the blade 76 into the oncoming meat.

A pair of vertically disposed air cylinders 82 are secured to the rearward portion of frame 10 (FIGURES 2 and 5), and a piston rod 84 with a piston 86 on the lower end thereof extends upwardly and outwardly therefrom through grommets 88 to a pivotal connection 90 with the bottom of shoe 70. Springs 92 extend between the tops of cylinders 82 to normally urge the piston rod upwardly. Cooperating shoulders at 96 on the cylinders 82 and piston rods 84 limit the upper movement of the rods. When the pistons 86 are in the "upper" position of FIGURE 5, the shoe 70 and shoe assembly 68 are in their upper or nonoperating positions.

The pistons 86 can be moved to a lower position in cylinders 82 by introducing compressed air into the upper ends of the cylinders. This phenomenon will cause the shoe assembly 68 to pivot about pins 80 so that the shoe will move from the positions of FIGURES 5 and 6 towards the ultimate operating position in FIGURE 8. Air lines 98 connects the upper ends of cylinders 82 to a solenoid-controlled air valve 100 (FIGURE 2), which in turn is connected to a source of compressed air 102 (FIGURE 11). The solenoid of valve 100 is connected to a conventional photoelectric cell 104 (FIGURE 5) which is positioned laterally and slightly forwardly of the skinning blade 76. Air valve 100 is normally closed and photoelectric cell 104 normally has its contact points in an open condition. A source of light such as bulb 106 is mounted laterally directly across from photoelectric cell 104, and the contact points of the cell remain open until the beam of light from bulb 106 is broken. The breaking of the beam of light by a piece of meat will permit photoelectric cell 104 to close, whereupon the solenoid of valve 100 will open the valve to provide air to cylinders 82. Valve 100 has an exhaust port to relieve the cylinders of compressed air when the valve is open, so that the springs 92 can move the pistons upwardly whenever valve 100 opens.

The downward movement of shoe assembly 68 is limited by adjustable cams 108 (FIGURES 5 and 10) on arms 72 thereof which engage stop elements 110 on housing 14. Cams 108 can be rotated to adjust the degree of downward movement of the shoe assembly. With reference to FIGURE 8, the concave surface 74 of shoe 70 is separated a few thousandths of an inch from the teeth of gripping roll 48, and the curvature of the concave surface 74 is concentric with the outer periphery of the teeth.

With reference to FIGURES 2 and 5, it is noted that the gripping surface of roll 48 is comprised of a plurality of continuous longitudinal teeth or serrations 112 which slant in the direction of the roll. These serrations are not intermittently interrupted along their length by objectionable finger stripping grooves as were the rolls in the aforementioned patents, and as a consequence, the skin is more uniformly supported on the serrations or teeth, and no residue ribbons of fat are left on the skin.

With respect to the skin engaging surface of the stripper roll 50, it is likewise provided with continuous elongated serrations or teeth 114 which slant in the direction of rotation. These teeth may also be longitudinally arranged but are preferably spirally arranged as shown in FIGURE 2. The spiral configuration of teeth 114 is superior in that a self-cleaning action is produced by a tendency to auger anything that does stick to the teeth end-wise along the roll, and the material accumulates at the end thereof and finally drops off without the necessity of a manual cleaning operation being required.

With reference to FIGURE 11, lines 116 and 118 extend from photoelectric cell 104 from a source of electrical power. Bulb 106 is connected across these lines as is motor 16. Switch 120 is imposed in line 116 to control the machine.

A conventional pressure responsive electrical switch 122 (FIGURE 12) may be substituted for photoelectric cell 104, in which case bulb 106 would also be eliminated. Switch 122 would assume the same position as cell 104, and would control valve 100 in the same manner as did cell 104.

The normal operation of the device of this invention is as follows: The cams 108 are set to provide a few thousandths of an inch clearance between the concave surface 74 of shoe 70 and the outer periphery of teeth 112 on gripper roll 34 when the shoe assembly 68 is in its lower operating position (FIGURE 8). When switch 120 is closed, motor 16 is started and bulb 16 is lighted to maintain the contacts of photoelectric cell 104 in an open position. This leaves solenoid air switch 100 in its normally closed condition to keep compressed air out of cylinders 82, whereupon the springs 92 function in the manner described to push the shoe assembly 68 to its upper position (FIGURES 5 and 6). The power train previously described will cause the hold-down roller 66, the conveyor belt 50, the gripper roll 34, and the stripping roll 44 to rotate in the direction of the arrows indicated in FIGURE 5. The stripper roll 44 rotates at a faster speed than gripper roll 34. It is important to note that the gripper roll 34 and stripping roll 44 rotate in the same direction, with the stripping roll being separated from the gripping roll a few thousandths of an inch and being positioned beneath and slightly rearwardly of the gripper roll.

Slabs of meat M with a layer of skin S are deposited (usually in rapid sequence) on belt 50, and are engaged and stabilized by the hold-down roller 66 (FIGURE 6) as the meat approaches the cutting zone. The continued rearward movement of the meat brings the skin S on the lower surface thereof into initial contact with the teeth 112 on gripping roll 34. Because the teeth are longitudinally continuous, the meat and skin thereof are held in a straight longitudinal plane which was not possible on earlier machines in the art wherein the gripping roll had a plurality of annular grooves on its surface to accommodate stripping elements, which permitted some slumping of the meat and skin into these grooves.

The instant that the meat breaks the beam of light from bulb 106 (or actuates pressure switch 122 if such is used in lieu of photoelectric cell 104), the photoelectric cell 104 functions in the manner previously described, whereupon air is provided to cylinders 82 by valve 100 to lower the shoe assembly 68 to the position of FIGURE 8. The instantaneous reaction of the shoe assembly 68 to the oncoming meat is highly important, because it permits blade 76 to make an instantaneous bite into the meat which substantially reduces the residue of fat on the leading edge of the separated skin as the blade 76 seeks out the thickness of the skin. Because the inoperative position of the blade in FIGURE 6 is substantially above the gripping roll 34 a distance greater than the thickness of skin S, it will be appreciated that considerable fat would be left on the first portion of separated skin if the shoe 70 and blade 76 were permitted anything other than an instant to move to the ultimate skinning position of FIGURE 8. The position of the shoe 70 and blade 76 in FIGURE 7 depicts the initial entry of the blade 76 into the meat in that fractional second as the shoe 70 moves from the position of FIGURE 6 to that of FIGURE 8.

Two other highly important phenomena come into play during this same instant that the shoe assembly is moved into its skinning position. The arms 72 on shoe assembly 68 have been carefully pivoted forwardly and slightly above the cutting zone defined by the cutting edge of blade 76. It has been determined that the geometrical relationship between the cutting edge of the downwardly beveled blade 76 and the pivotal axis of the arms 72 permits a vastly superior initial penetration of the meat by the blade, than if the arms 72 were pivoted elsewhere, particularly at a point rearwardly rather than forwardly as determined by the location of pins 80.

A second phenomenon that is highly important is that the concave surface 174 of shoe 70 is held in a position concentric with the periphery of the teeth 112 on gripping roll 34, and this uniform spacing of the surface 74 with respect to the teeth achieves a beneficial result when this position is maintained throughout the skinning operation. Not the least of these advantages is that the skin is held against the teeth of the gripping roll with uniform pressure, with no excess pressure being applied thereto particularly in the area of blade 76. As a consequence, the skin is not penetrated by the teeth 112 of gripping roll 34, and the skin can then be used for more profitable purposes such as leather rather than for less profitable uses such as gelatin. The concave surfaces of the shoes of the previously patented machines were not held as a matter of course in the above-described concentric relationship with the teeth of the gripping roller throughout the duration of the skinning operation. The precise operating position of the shoes of these earlier machines during the skinning operation was either determined by the tolerances of the treadles or the reaction abilty of the machine operator, and in many instances the machines were dowelled to hold the bottom of the shoe further away from the gripping roll than the top of the shoe so as to concentrate pressure on the skin in the area of the blade. The present method of controlling and positioning the shoe 70 achieves more efficient skinning results, and the separated skin is not perforated or multilated in the manner of the prior machines.

By providing a stripping roll remote from the gripping roller, the entire longitudinal length of the teeth 112 on gripping roll 34 can be used to support the skin to achieve the superior yield discussed heretofore. The skin S follows the gripper roll 34 until the lower edge of the skin engages the teeth of stripper roll 44, whereupon the skin is reversed in direction and pulled away from the roll 14 as illustrated. Soon after the initial engagement of the skin with the stripper roll the increased surface speed of the stripper roll tends to pull the skin to the solid-line bridging position shown and away from the skinning roll thereby efficiently stripping the skin from the skinning roll and disposing of it as far as the skinning machine is concerned. The skins may drop into a container or may be delivered to a chute, conveyor or the like.

Thus, from the foregoing, it is seen that this invention will accomplish at least all of its stated objectives.

What is claimed is:
1. In a meat skinning machine
 a gripping roll,
 a blade means positioned adjacent said gripping roll,
 means for rotating said gripping roll whereby a layer of meat can be moved toward said blade means to separate a layer of skin from said meat,
 power control means for moving said blade means from an inoperative position away from said gripping roll to an operative cutting position adjacent said gripping roll,
 and means responsive to the movement of meat towards said blade means and connected to said control means whereby said control means will move said blade means to said operative cutting position when actuated by meat moving towards said blade means.

2. The skinning machine of claim 1 wherein the means responsive to the movement of meat includes a light source and a photoelectric cell positioned on opposite sides of the path of travel of said meat.

3. The skinning machine of claim 1 wherein the means responsive to the movement of meat includes a pressure responsive electrical switch positioned adjacent the path of travel of said meat.

4. The skinning machine of claim 1 wherein said power means includes a cylinder and reciprocating piston assembly operatively connected to said blade means whereby reciprocation of said piston assembly will move said blade means to and from its inoperative and operative positions.

5. The skinning machine of claim 1 wherein the means responsive to the movement of meat includes a light source and a photoelectric cell positioned on opposite sides of the path of travel of said meat, said power means includes a cylinder and reciprocating piston assembly operatively connected to said blade means whereby reciprocation of said piston assembly will move said blade means to and from its inoperative and operative positions, said photoelectric cell being operatively connected to a solenoid air valve which is connected to a source of compressed air wherein compressed air will be supplied to said cylinder and reciprocating piston assembly when said solenoid air valve is actuated through the action of said photoelectric cell.

6. The skinning machine of claim 1 wherein the means responsive to the movement of meat includes a pressure responsive electrical switch positioned adjacent the path of travel of said meat, said power means includes a cylinder and reciprocating piston assembly operatively connected to said blade means whereby reciprocation of said piston assembly will move said blade means to and from its inoperative and operative positions, said pressure responsive electrical switch being operatively connected to a solenoid air valve which is connected to a source of compressed air wherein compressed air will be supplied to said cylinder and reciprocating piston assembly when said solenoid air valve is actuated through the action of said pressure responsive electrical switch.

7. The skinning machine of claim 4 wherein adjustable stop means are provided to limit the movement of said piston assembly.

References Cited

UNITED STATES PATENTS

| | | | |
|---|---|---|---|
| 2,373,361 | 4/1945 | Walter | 146—130 |
| 3,249,139 | 5/1966 | Runnells et al. | 146—130 |

W. GRAYDON ABERCROMBIE, Primary Examiner